(12) United States Patent
Suanno

(10) Patent No.: US 11,987,302 B2
(45) Date of Patent: May 21, 2024

(54) RIM FOR A TRACK ROLLER

(71) Applicant: Caterpillar Inc., Peoria, IL (US)

(72) Inventor: Gennaro Suanno, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 666 days.

(21) Appl. No.: 17/248,353

(22) Filed: Jan. 21, 2021

(65) Prior Publication Data

US 2022/0227437 A1    Jul. 21, 2022

(51) Int. Cl.
 B62D 55/084      (2006.01)

(52) U.S. Cl.
 CPC ..... B62D 55/0842 (2013.01); B62D 55/0847 (2013.01); *B60G 2300/32* (2013.01)

(58) Field of Classification Search
 CPC .................................. B62D 55/0847
 See application file for complete search history.

(56) References Cited

U.S. PATENT DOCUMENTS

| | | | | |
|---|---|---|---|---|
| 1,597,340 A * | 8/1926 | Best | ............... | B21D 53/26 305/136 |
| 2,480,908 A * | 9/1949 | Davies | ............... | B62D 55/15 277/403 |
| 3,910,128 A * | 10/1975 | Boggs | ............... | B62D 55/15 474/151 |
| 3,937,528 A | 2/1976 | Clemens et al. | | |
| 4,371,362 A * | 2/1983 | Dorris | ............... | B60B 25/02 474/902 |
| 6,280,009 B1 | 8/2001 | Oertley | | |
| 6,435,628 B1 * | 8/2002 | Hasselbusch | ............... | B62D 55/15 305/129 |
| 8,231,184 B2 * | 7/2012 | Mulligan | ............... | B62D 55/15 305/136 |
| 8,398,182 B2 | 3/2013 | Simula et al. | | |
| 9,764,785 B2 * | 9/2017 | Kita | ............... | B62D 55/14 |
| 10,086,889 B2 * | 10/2018 | Kita | ............... | B60B 37/04 |
| 2002/0153775 A1 | 10/2002 | Egle | | |
| 2004/0084961 A1 * | 5/2004 | Yamamoto | ............... | B62D 55/14 305/136 |
| 2006/0181149 A1 | 8/2006 | Oertley | | |
| 2011/0285091 A1 * | 11/2011 | Wodrich | ............... | B22D 19/08 277/377 |
| 2012/0056473 A1 | 3/2012 | Hashimoto et al. | | |
| 2012/0146397 A1 * | 6/2012 | Hisamatsu | ............... | B62D 55/15 305/100 |
| 2015/0008729 A1 * | 1/2015 | Kita | ............... | B62D 55/15 305/136 |
| 2016/0236734 A1 * | 8/2016 | Kita | ............... | B62D 55/092 |

* cited by examiner

*Primary Examiner* — Minnah L Seoh
*Assistant Examiner* — Hosam Shabara

(57) ABSTRACT

A rim includes a wall, a first annular projection, and a second annular projection. The wall has a first end and a second end. The first end includes a first opening, and the second end includes a second opening that communicates with the first opening to define a bore for a shaft of a track roller. The first annular projection and the second annular projection, which are configured to engage a track, extend radially from the wall. The first annular projection includes a first flange that is configured to constrain movement of the track in a first axial direction. The first flange includes a plurality of notches. The second annular projection includes a second flange that is configured to constrain movement of the track in a second axial direction that is opposite to the first axial direction.

20 Claims, 4 Drawing Sheets

RIM FOR A TRACK ROLLER

TECHNICAL FIELD

The present disclosure relates generally to a track roller of an undercarriage and, for example, to a rim for the track roller.

BACKGROUND

In industries such as construction, mining, and forestry, a machine may utilize a track to distribute weight of the machine on a ground surface. As a result, the machine may be configured to traverse the ground surface with less likelihood of becoming stuck compared to wheel-driven machines. In such a machine, a plurality of track rollers are rotatably connected to an undercarriage frame to guide the track therearound. In order to support the weight of the machine and withstand forces associated with operation of the machine, the plurality of track rollers may have a robust structure that is expensive to manufacture.

U.S. Pat. No. 6,280,009 discloses a carrier roller assembly for guiding and supporting an endless track of a track-type machine. The roller includes a shell having first and second end portions and an intermediate portion. A plurality of bearings are positioned between the roller shell and a mounting shaft. A plurality of segments having first and second end portions and an intermediate portion are positioned around the roller shell to define a rim having substantially continuous track bearing surfaces thereon and positioned for the intermediate portion to contact the intermediate portion of the roller shell. A first resilient ring is positioned around the first end portion of the roller shell to support the first end portion of the rim member. A second resilient ring is positioned around the second end portion of the roller shell to support the second end portion of the rim member.

The rim of the present disclosure solves one or more of the problems set forth above and/or other problems in the art.

SUMMARY

In some implementations, a rim for a track roller includes a wall having a first end and a second end that is opposite to the first end, wherein the first end includes a first opening, and the second end includes a second opening that communicates with the first opening to define a bore for a shaft of the track roller; a first annular projection extending radially from the wall to engage a first edge of a track, the first annular projection including: a first exterior flange having a first plurality of exterior notches, wherein the first exterior flange is configured to constrain movement of the track in a first axial direction, and the first exterior flange is formed from a single, integral piece of material; and a second annular projection extending radially from the wall to engage a second edge of the track, the second annular projection including: a second exterior flange that is configured to constrain movement of the track in a second axial direction that is opposite to the first axial direction.

In some implementations, a rim segment for a track roller includes a wall having a first end and a second end, wherein the first end includes a first opening, and the second end includes a second opening that communicates with the first opening to define a bore for a shaft of the track roller; and an annular projection extending radially from the wall, the annular projection including: a base portion that is configured to contact an edge of a track, and an exterior flange that is configured to constrain axial movement of the track, wherein the exterior flange includes a plurality of notches, and the exterior flange has a diameter that is greater than a diameter of the base portion.

In some implementations, a rim segment for a track roller includes a substantially cylindrical wall having a first end and a second end; and an annular projection extending radially from the substantially cylindrical wall, the annular projection including: a base portion that is configured to contact an edge of a track, and an exterior flange that is configured to constrain axial movement of the track, wherein the exterior flange includes a plurality of notches, and the exterior flange has a diameter that is greater than a diameter of the base portion; wherein the rim segment is made of a single, integral piece of material.

DETAILED DESCRIPTION

Figure 1:
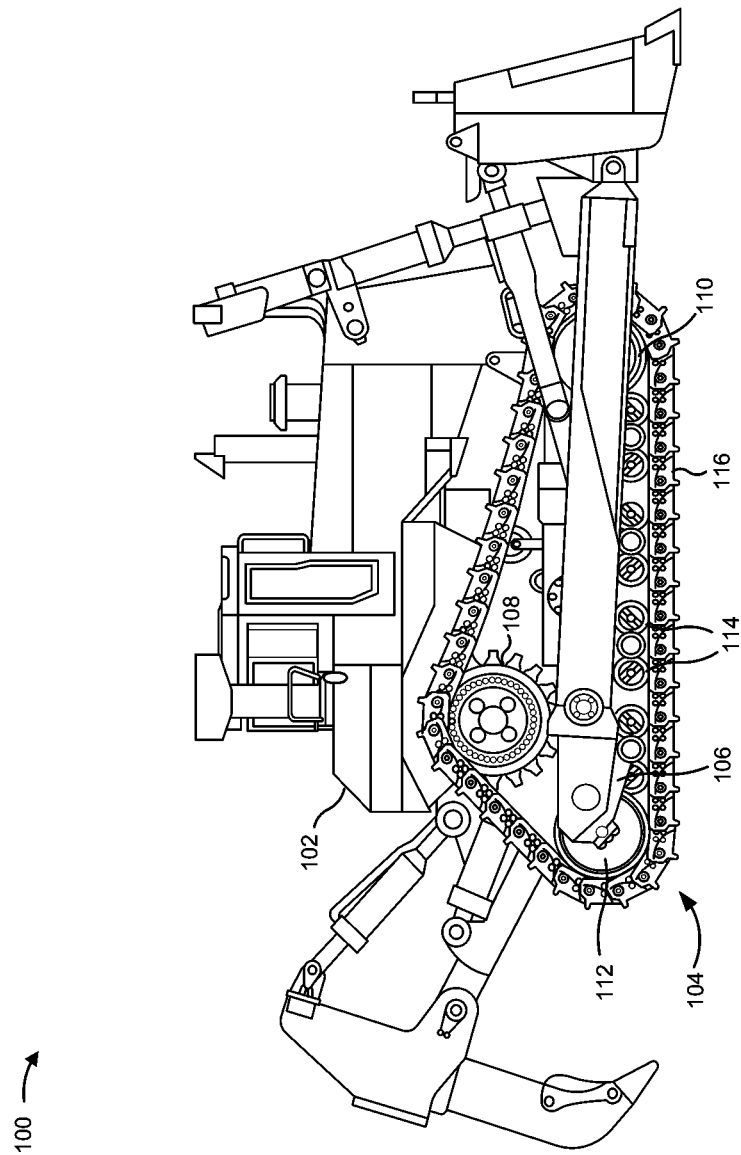
FIG. 1 is an isometric view of an exemplary machine having a plurality of track rollers engaging and guiding a track.

This disclosure relates to a rim for a track roller, which is applicable to any machine having a track. While a dozer is illustrated in FIG. 1, other types of machines are contemplated. For example, the machine may be a tractor, a loader, an excavator, a conveyor system, or another type of machine.

To simplify the explanation below, the same reference numbers may be used to denote like features. The drawings may not be to scale.

FIG. 1 depicts an exemplary machine 100. As shown in FIG. 1, the machine 100 includes a machine body 102 and an undercarriage 104 that supports and enables movement of the machine body 102. The undercarriage 104 includes a frame 106, a sprocket 108, a front idler 110, a rear idler 112, a plurality of track rollers 114, and a track 116 extending therearound. The frame 106 is a structure that supports the sprocket 108, the front idler 110, the rear idler 112, the plurality of track rollers 114, and the track 116. In some implementations, the frame 106 may include a recoil mechanism (not shown) to adjust tension in the track 116. The sprocket 108, which is rotatably mounted to an upper end of the frame 106, is configured to drive the track 116 around the frame 106. The front idler 110 and the rear idler 112 are respectively mounted to a front end and a rear end of the frame 106 and are configured to guide the track 116 therearound. The plurality of track rollers 114 are rotatably mounted to a lower end of the frame 106 and are configured to engage and guide the track 116 therealong between the front idler 110 and the rear idler 112. The track 116 is a ground-engaging device that encircles the frame 106 and propels the machine 100.

Although only one undercarriage 104 is depicted in FIG. 1, it should be understood that the machine 100 includes a second undercarriage arranged on an opposite side of the machine body 102. The second undercarriage substantially mirrors the undercarriage 104.

As indicated above, FIG. 1 is provided as an example. Other examples may differ from what is described with regard to FIG. 1. For example, the number and arrangement of components may differ from that shown in FIG. 1. Thus, there may be additional components, fewer components, different components, differently shaped components, differently sized components, and/or differently arranged components than those shown in FIG. 1. For example, in some implementations, an undercarriage of a machine may not include a rear idler. In such an example, the undercarriage may include a front idler, a sprocket in place of the rear idler, and a plurality of track rollers arranged between the sprocket and the front idler.

An exemplary rim 200 (shown in FIGS. 2-4) and an exemplary rim segment 500 (shown in FIG. 5), which constitute alternative components of a track roller 114 of the plurality of track rollers 114, will be described below. While not expressly shown, it should be understood that the track roller 114 further includes a shaft, which connects the track roller 114 to the frame 106, and one or more additional components that allow the rim 200 or the rim segment 500 to rotate relative to the shaft (e.g., one or more bearings, one or more bushings, and/or lubricant).

Figure 2:
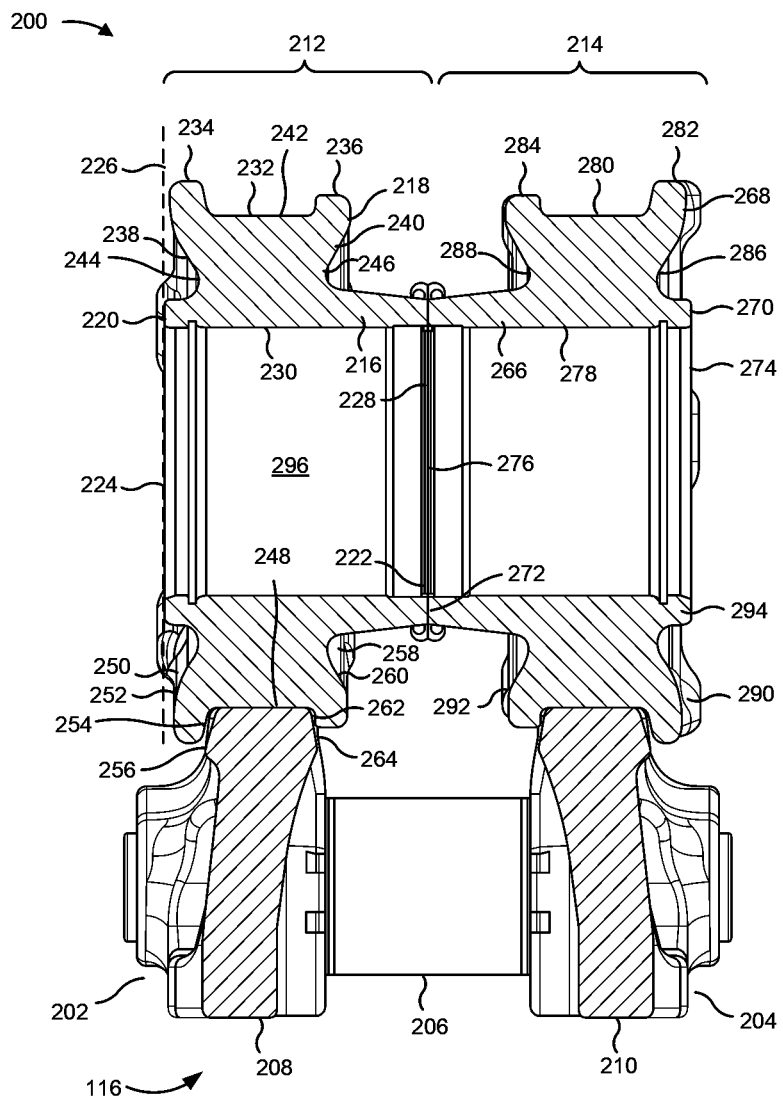
FIG. 2 is cross-sectional view of an exemplary rim of one of the plurality of track rollers engaging links of the track.
Figure 3:
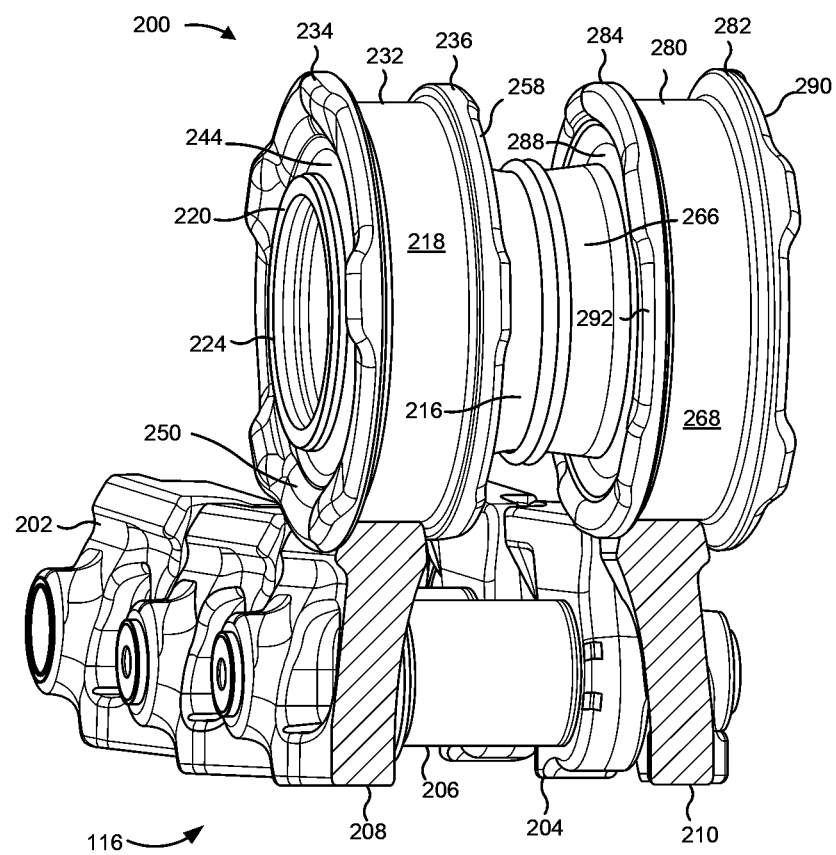
FIG. 3 is an isometric cross-sectional view of the rim engaging the links of the track.

FIGS. 2-3 depict the rim 200 in engagement with the track 116. The track 116 includes a first plurality of links 202, a second plurality of links 204, and a plurality of pins 206 that connect the first plurality of links 202 and the second plurality of links 204. The first plurality of links 202 define a first edge 208 of the track 116, and the second plurality of links 204 define a second edge 210 of the track 116 that is opposite to the first edge 208.

As shown in FIGS. 2-3, the rim 200 includes a first rim segment 212 and a second rim segment 214. The first rim segment 212 includes a first wall portion 216 and a first annular projection 218. The first wall portion 216, which is substantially cylindrical, includes a first outer end 220 and a first inner end 222 that is opposite to the first outer end 220. The first outer end 220 includes a first outer opening 224 within a first plane 226. The first inner end 222 includes a first inner opening 228 that communicates with the first outer opening 224 to define a first bore 230 that is configured to receive the shaft.

The first annular projection 218 radially extends from the first wall portion 216 and is configured to engage the first edge 208 of the track 116. The first annular projection 218 includes a first base portion 232, a first exterior flange 234, and a first interior flange 236, which together are configured to cradle the first edge 208 of the track 116 and constrain axial movement thereof. The first base portion 232 includes a first exterior surface 238, a first interior surface 240, and a first lateral surface 242 that connects the first exterior surface 238 to the first interior surface 240. The first exterior surface 238 is substantially adjacent to the first outer end 220 of the first wall portion 216, and the first interior surface 240 is spaced from the first inner end 222 of the first wall portion 216. To reduce the weight of the first rim segment 212, the first exterior surface 238 and the first interior surface 240 respectively include a first exterior groove 244 and a first interior groove 246, which are annular and substantially concentric with the first wall portion 216. The first lateral surface 242 is configured to contact and guide a first upper surface 248 of the first edge 208 of the track 116. In other words, the first lateral surface 242 has a shape and size that substantially matches a shape and size of the first upper surface 248.

The first exterior flange 234 extends radially from the first lateral surface 242. To further reduce the weight of the first rim segment 212, the first exterior flange includes a first plurality of exterior notches 250 (shown more clearly in FIGS. 3-4). The first plurality of exterior notches 250 extend axially to form a first exterior undulating surface 252 of the first exterior flange 234 that is adjacent to the first exterior surface 238 of the first base portion 232. In order to constrain movement of the first edge 208 of the track 116 in a first axial direction, the first exterior flange 234 further includes a first exterior angled surface 254 that is opposite to the first exterior undulating surface 252. In some implementations, to minimize wear resulting from repeated contact with the first edge 208 of the track 116, an angle of the first exterior angled surface 254 may be substantially equal to an angle of a first outer side surface 256 of the first edge 208 of the track 116. For example, the angle may be in a range of approximately 10 degrees to approximately 25 degrees relative to the first plane 226.

The first interior flange 236 is axially spaced from the first exterior flange 234. Similar to the first exterior flange 234, the first interior flange 236 extends radially from the first lateral surface 242. To further reduce the weight of the first rim segment 212, the first interior flange 236 likewise includes a first plurality of interior notches 258 (shown more clearly in FIG. 3). The first plurality of interior notches 258 extend axially to form a first interior undulating surface 260 of the first interior flange 236 that is adjacent to the first interior surface 240 of the first base portion 232. In order to constrain movement of the first edge 208 of the track 116 in a second axial direction that is opposite to the first axial direction, the first interior flange 236 further includes a first interior angled surface 262 that is opposite to the first interior undulating surface 260. In some implementations, to minimize wear resulting from repeated contact with the first edge 208 of the track 116, an angle of the first interior angled surface 262 may substantially equal an angle of a first inner side surface 264 of the first edge 208 of the track 116. For example, the angle may be in a range of approximately 10 degrees to approximately 25 degrees relative to the first plane 226. In some implementations, depending on the shape of the track 116, the angle of the first interior angled surface 262 may differ from the angle of the first exterior angled surface 254.

To provide clearance between the first wall portion 216 and the track 116, the first base portion 232 has a diameter that is greater than a diameter of the first wall portion 216. For example, the diameter of the first base portion 232 may be in a range of approximately 164 millimeters (mm) to approximately 330 mm. To constrain movement of the first edge 208 of the track 116 in the first axial direction, the first exterior flange 234 has a diameter that is greater than a diameter of the first base portion 232. For example, the diameter of the first exterior flange 234 may be in a range of approximately 199 mm to approximately 395 mm. As an example, a ratio of the diameter of the first base portion 232 to the diameter of the first exterior flange 234 may be in a range of approximately 0.8 to approximately 0.94. To constrain movement of the first edge 208 of the track 116 in the second axial direction, the first interior flange 236 has a diameter that is greater than the diameter of the first base portion 232. In some implementations, the diameter of the first interior flange 236 may be between the diameter of the first base portion 232 and the diameter of the first exterior flange 234.

The second rim segment 214 substantially mirrors the first rim segment 212. Thus, while the description to follow is simplified, it should be understood that the above description of the first rim segment 212 equally applies to the description below of the second rim segment 214. The second rim segment 214 includes a second wall portion 266 and a second annular projection 268. The second wall portion 266, which is substantially cylindrical, includes a second outer end 270 and a second inner end 272 that is opposite to the second outer end 270. The second outer end 270 includes a second outer opening 274. The second inner end 272 includes a second inner opening 276 that communicates with the second outer opening 274 to define a second bore 278 that is configured to align with the first bore 230 to receive the shaft.

The second annular projection 268 radially extends from the second wall portion 266 and is configured to engage the second edge 210 of the track 116. The second annular projection 268 includes a second base portion 280, a second exterior flange 282, and a second interior flange 284, which together are configured to cradle the second edge 210 of the track 116 and constrain axial movement thereof. To reduce the weight of the second rim segment 214, the second base portion 280 includes a second exterior groove 286 and a second interior groove 288, which are annular and substantially concentric with the second wall portion 266.

The second exterior flange 282 extends radially from the second base portion 280. To further reduce the weight of the second rim segment 214, the second exterior flange includes a second plurality of exterior notches 290 (shown more clearly in FIG. 3). The second interior flange 284 is axially spaced from the second exterior flange 282. Similar to the second exterior flange 282, the second interior flange 284 extends radially from the second base portion 280. To further reduce the weight of the second rim segment 214, the second interior flange 284 likewise includes a second plurality of interior notches 292 (shown more clearly in FIG. 3).

To assemble the rim 200, a manufacturer may independently forge the first rim segment 212 and the second rim segment 214 out of a hardenable metal (e.g., boron steel). After forging the first rim segment 212 and the second rim segment 214, the manufacturer may weld the first inner end 222 of the first rim segment 212 to the second inner end 272 of the second rim segment 214 to form the rim 200. To extend a wear life of the rim 200 (e.g., in a range of approximately 2,000 hours to approximately 6,000 hours, depending on usage), the manufacturer may harden the rim 200 via heat treatment. Once so assembled, the first wall portion 216 and second wall portion 266 together define a wall 294 of the rim 200, and the first bore 230 and the second bore 278 together define a bore 296 of the rim 200. In some implementations, the first rim segment 212 and the second rim segment 214 may be integrally formed (e.g., by casting) or combined via one or more different types of attachment mechanisms (e.g., threaded fasteners, annular clamps, and/or the like).

As indicated above, FIGS. 2-3 are provided as an example. Other examples may differ from what is described with regard to FIGS. 2-3. For example, the number and arrangement of components may differ from that shown in FIGS. 2-3. Thus, there may be additional components, fewer components, different components, differently shaped components, differently sized components, and/or differently arranged components than those shown in FIGS. 2-3. For example, to simplify manufacturing of the rim 200, at least one of the first exterior groove 244, the first interior groove 246, the first plurality of interior notches 258, the first interior flange 236, the second exterior groove 286, the second interior groove 288, the second plurality of interior notches 292, or the second interior flange 284 may be eliminated from the rim 200.

Figure 4:
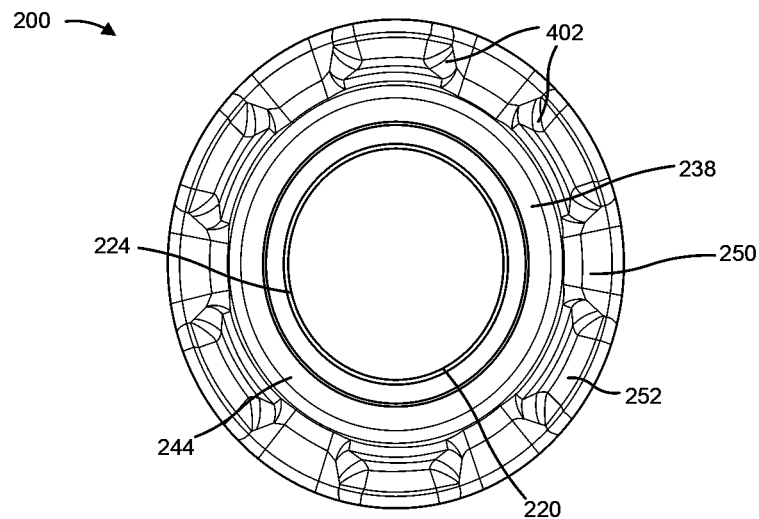
FIG. 4 is a side view of the rim.

FIG. 4 depicts the first plurality of exterior notches 250 and the first exterior groove 244 of the rim 200. As indicated above, the first plurality of interior notches 258, the second plurality of exterior notches 290, and the second plurality of interior notches 292 may have substantially the same structure and arrangement as the first plurality of exterior notches 250. Likewise, the first interior groove 246, the second exterior groove 286, and the second interior groove 288 may have substantially the same structure and arrangement as the first exterior groove 244.

As shown in FIG. 4, the first plurality of exterior notches 250 are circumferentially and evenly arranged around the first exterior groove 244. The first plurality of exterior notches 250 may include chamfered surfaces 402 to minimize a potential of damage to the first plurality of exterior notches 250 and/or limit accumulation of dirt or debris within the first plurality of exterior notches 250. Each of the first plurality of exterior notches 250 may have a substantially trapezoidal shape, with a width in a circumferential direction that is greater than a height in a radial direction. Other shapes and/or arrangements of the first plurality of exterior notches 250 and the first exterior groove 244 are contemplated. For example, in some implementations, the height in the radial direction of one or more of the first plurality of exterior notches 250 may extend from an outer edge of the first exterior flange 234 to the first outer end 220 of the first wall portion 216. In such an example, the height may be substantially equal to a width in the circumferential direction of the one or more of the first plurality of exterior notches 250.

As indicated above, FIG. 4 is provided as an example. Other examples may differ from what is described with regard to FIG. 4. For example, the number and arrangement of components may differ from that shown in FIG. 4. Thus, there may be additional components, fewer components, different components, differently shaped components, differently sized components, and/or differently arranged components than those shown in FIG. 4. For example, the first plurality of exterior notches 250 may include a quantity of notches that is greater than or less than the six notches shown.

Figure 5:
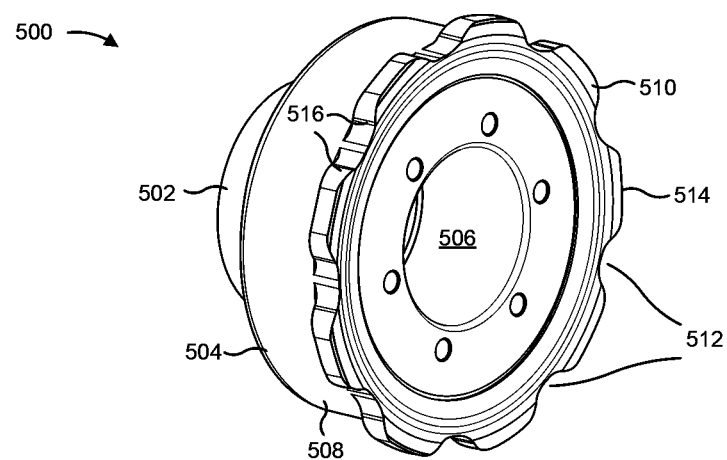
FIG. 5 is an isometric view of an exemplary rim segment of one of the plurality of track rollers.

FIG. 5 depicts the rim segment 500. It should be understood that the rim segment 500 may be attached or integrally formed with another rim segment to form a rim, as described above with respect to the rim 200. Furthermore, the rim segment 500 may have substantially the same dimensions and be made of the same material as the rim 200. As shown in FIG. 5, the rim segment 500 includes a wall portion 502 and an annular projection 504. The wall portion 502, which has substantially the same structure as the first wall portion 216, includes a bore 506 extending therethrough to receive the shaft. The annular projection 504 includes a base portion 508, which has substantially the same structure as the first base portion 232, and an exterior flange 510. Together, the base portion 508 and the exterior flange 510 are configured to engage and guide the first edge 208 of the track 116. The exterior flange 510, which extends radially from the base portion 508, includes a plurality of notches 512 to reduce the weight of the rim segment 500. The plurality of notches 512 extend radially to form an undulating perimeter 514 of the exterior flange 510. The plurality of notches 512 may include chamfered surfaces 516 to minimize a potential of damage to the plurality of notches 512 and/or limit accumulation of dirt or debris within the plurality of notches 512.

Each of the first plurality of notches 512 may have a substantially trapezoidal shape, with a width in a circumferential direction that is greater than a height in a radial direction. Other shapes and/or arrangements of the plurality of notches 512 are contemplated.

As indicated above, FIG. 5 is provided as an example. Other examples may differ from what is described with regard to FIG. 5. For example, the number and arrangement of components may differ from that shown in FIG. 5. Thus, there may be additional components, fewer components, different components, differently shaped components, differently sized components, and/or differently arranged components than those shown in FIG. 5. For example, to further reduce the weight of the rim segment 500 and/or improve guidance of the track 116, the rim segment 500 may include one or more of an exterior groove, an interior flange, a plurality of interior notches, or an interior groove (e.g., as structured and arranged within the rim 200). As a further example, the plurality of notches 512 may include a quantity greater than or less than the nine notches shown.

While the rim 200 and the rim segment 500 have been discretely described above as alternative components of the track roller 114, it should be understood that features of the rim 200 and features of the rim segment 500 may be combined to form a hybrid rim. For example, the hybrid rim may include one or more axially-extending notches and one or more radially-extending notches. In practice, the machine 100 may include one or more of the rim 200, one or more of the rim segment 500, one or more of the hybrid rim, and/or a combination thereof.

INDUSTRIAL APPLICABILITY

The rim of the present disclosure, which may constitute a component of a track roller (e.g., the track roller 114) or a carrier roller, is particularly applicable in a track-type machine, such as the machine 100. For example, the track-type machine may be a tractor, a dozer, a loader, an excavator, a conveyor system, or another type of machine.

By including one or more weight-reduction features in the rim (e.g., the first exterior groove 244, the first interior groove 246, the first plurality of exterior notches 250, the first plurality of interior notches 258, the second exterior groove 286, the second interior groove 288, the second plurality of exterior notches 290, the second plurality of interior notches 292, the plurality of notches 512, and/or the like), a manufacturer of the rim reduces an amount of material needed to form the rim. As a result, the manufacturer may reduce material-related costs while maintaining the track-guiding functionality of the rim. Additionally, by shaping the weight-reduction features with smooth, chamfered surfaces, the manufacturer may minimize a potential of damage to the rim and/or limit accumulation of dirt or debris within the rim. Furthermore, by shaping track-engaging surfaces (e.g., of the first annular projection 218, the second annular projection 268, and/or the annular projection 504) to substantially match upper surfaces of the track 116, the manufacturer may minimize wear resulting from repeated contact with the track 116 and therefore extend the wear life of the rim.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A rim for a track roller, the rim comprising:
   a wall having a first end and a second end that is opposite to the first end, wherein
      the first end includes a first opening, and
      the second end includes a second opening that communicates with the first opening to define a bore for a shaft of the track roller;
   a first annular projection extending radially from the wall to engage a first edge of a track, the first annular projection including:
      a first exterior flange having a first plurality of exterior notches, wherein
         the first plurality of exterior notches together form an undulating, annular shape on the first exterior flange,
         the first exterior flange is configured to constrain movement of the track in a first axial direction, and
         the first exterior flange is formed from a single, integral piece of material; and
   a second annular projection extending radially from the wall to engage a second edge of the track, the second annular projection including:

a second exterior flange that is configured to constrain movement of the track in a second axial direction that is opposite to the first axial direction.

2. The rim of claim 1, wherein
the first annular projection further includes a first base portion; and
the second annular projection further includes a second base portion, wherein
the first base portion and the second base portion have a diameter that is greater than a diameter of the wall, and
the first exterior flange and the second exterior flange have a diameter that is greater than the diameter of the first base portion and the second base portion.

3. The rim of claim 2, wherein
the diameter of the first base portion and the second base portion is in a range of approximately 164 millimeters to approximately 330 millimeters; and
the diameter of the first exterior flange and the second exterior flange is in a range of approximately 199 millimeters to approximately 395 millimeters.

4. The rim of claim 1, wherein
the first annular projection further includes a first interior flange axially spaced from the first exterior flange; and
the second annular projection further includes a second interior flange axially spaced from the second exterior flange.

5. The rim of claim 4, wherein
the second exterior flange includes a second plurality of exterior notches;
the first interior flange includes a first plurality of interior notches; and
the second interior flange includes a second plurality of interior notches.

6. The rim of claim 1, wherein the first plurality of exterior notches extend axially to form the undulating, annular shape on an exterior surface of the first exterior flange.

7. The rim of claim 1, wherein the first plurality of exterior notches extend radially to form the undulating, annular shape on perimeter of the first exterior flange.

8. The rim of claim 1, wherein
the first annular projection and a first wall portion of the wall together define a first rim segment;
the second annular projection and a second wall portion of the wall together define a second rim segment; and
the first rim segment is fixedly attached to the second rim segment via welding.

9. A rim segment for a track roller, the rim segment comprising:
a wall having a first end and a second end, wherein
the first end includes a first opening, and
the second end includes a second opening that communicates with the first opening to define a bore for a shaft of the track roller; and
an annular projection extending radially from the wall, the annular projection including:
a base portion that is configured to contact an edge of a track, and
an exterior flange that is configured to constrain axial movement of the track, wherein
the exterior flange includes a plurality of notches that together form an undulating, annular shape on the exterior flange, and
the exterior flange has a diameter that is greater than a diameter of the base portion.

10. The rim segment of claim 9, wherein the exterior flange includes an exterior surface that is adjacent to an exterior surface of the base portion, and
wherein the exterior surface includes the undulating, annular shape.

11. The rim segment of claim 10, wherein the exterior surface of the base portion includes an annular groove.

12. The rim segment of claim 9, wherein
the plurality of notches is an exterior plurality of notches; and
the annular projection further includes an interior flange that is axially spaced from the exterior flange,
wherein the interior flange includes an interior plurality of notches.

13. The rim segment of claim 9, wherein the plurality of notches include chamfered surfaces.

14. The rim segment of claim 9, wherein a perimeter of the exterior flange includes the undulating, annular shape.

15. A rim segment for a track roller, the rim segment comprising:
a substantially cylindrical wall having a first end and a second end; and
an annular projection extending radially from the substantially cylindrical wall, the annular projection including:
a base portion that is configured to contact an edge of a track, and
an exterior flange that is configured to constrain axial movement of the track, wherein
the exterior flange includes a plurality of notches that together form an undulating, annular shape on the exterior flange, and
the exterior flange has a diameter that is greater than a diameter of the base portion; and
wherein the rim segment is made of a single, integral piece of material.

16. The rim segment of claim 15, wherein a ratio of the diameter of the base portion to the diameter of the exterior flange is in a range of approximately 0.8 to approximately 0.94.

17. The rim segment of claim 15, wherein
the first end of the substantially cylindrical wall extends in a plane, and
an inner surface of the exterior flange forms an angle, relative to the plane, in a range of approximately 10 degrees to approximately 25 degrees.

18. The rim segment of claim 15, wherein a notch, of the plurality of notches, includes a width that is greater than a height of the notch.

19. The rim segment of claim 15, wherein the annular projection further includes an interior flange that includes a diameter that is sized between the diameter of the base portion and the diameter of the exterior flange.

20. The rim segment of claim 15, wherein the material is boron steel, and the rim segment is formed by forging the boron steel.

* * * * *